F. A. FROMMANN.
VEHICLE WHEEL.
APPLICATION FILED JAN. 6, 1913.
1,198,433.
Patented Sept. 19, 1916.
3 SHEETS—SHEET 1.
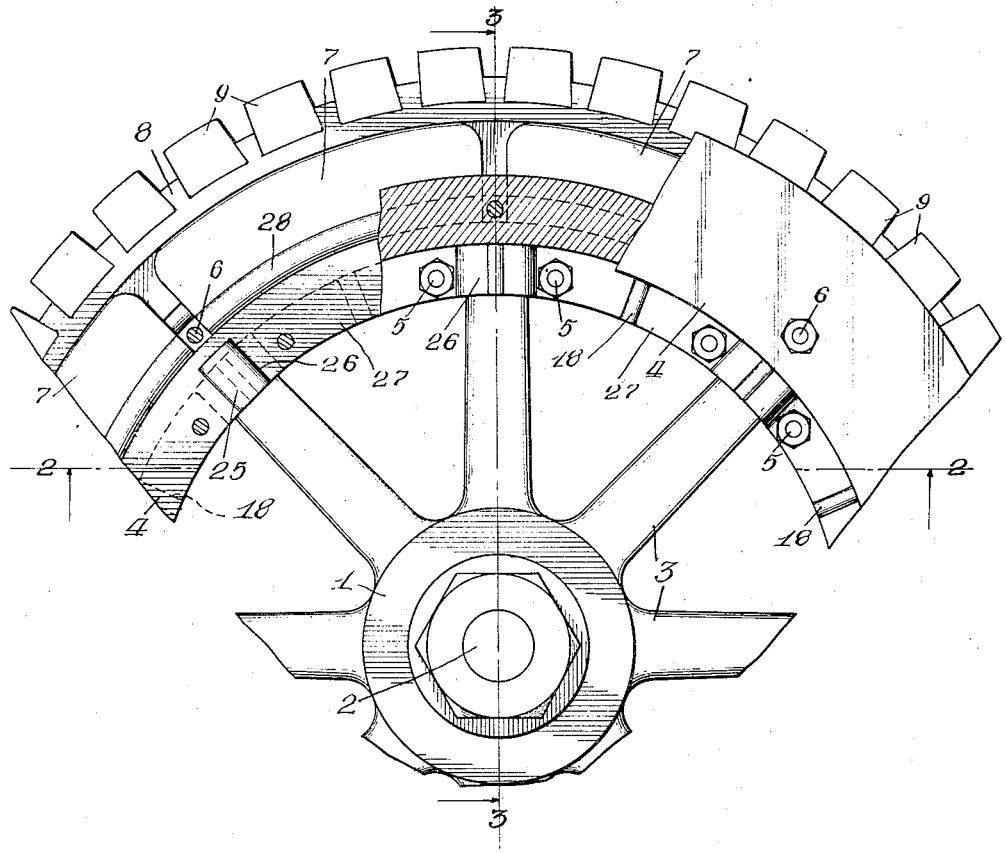
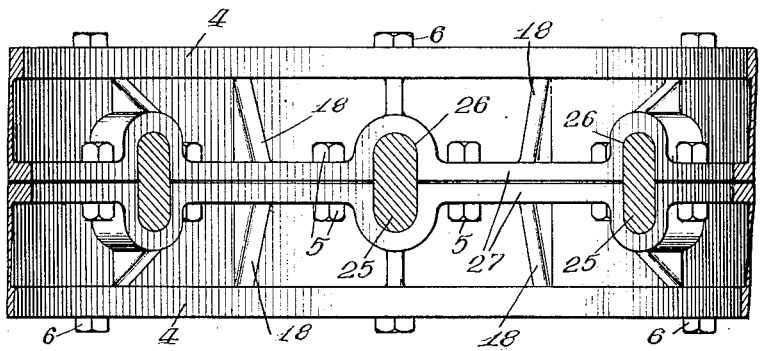
Witnesses:
Inventor:
Franklin A. Frommann
by Scheible
Attorneys

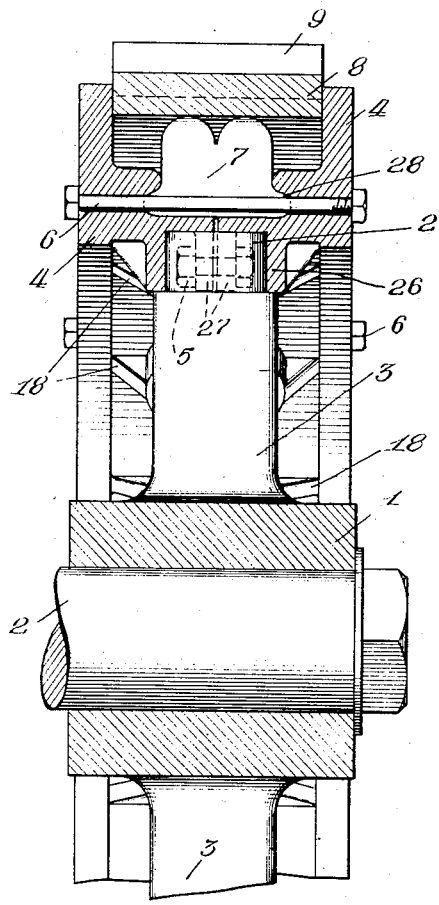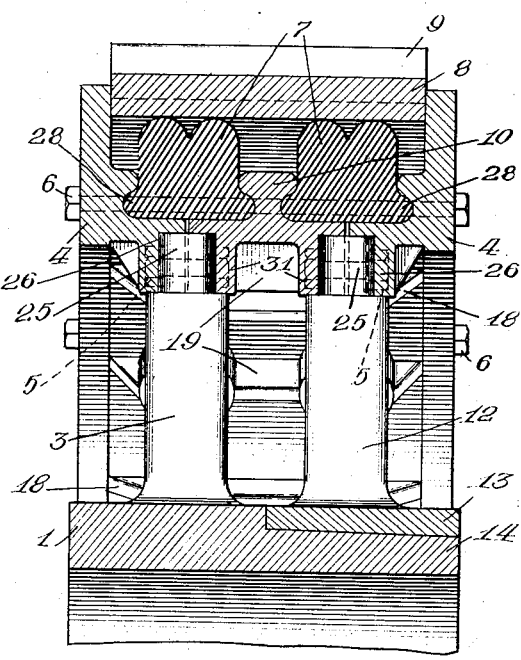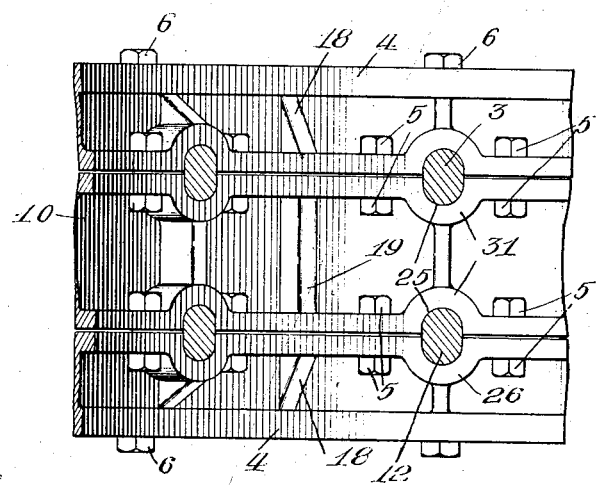

F. A. FRÖMMANN.
VEHICLE WHEEL.
APPLICATION FILED JAN. 6, 1913.
1,198,433.
Patented Sept. 19, 1916.
3 SHEETS—SHEET 3.
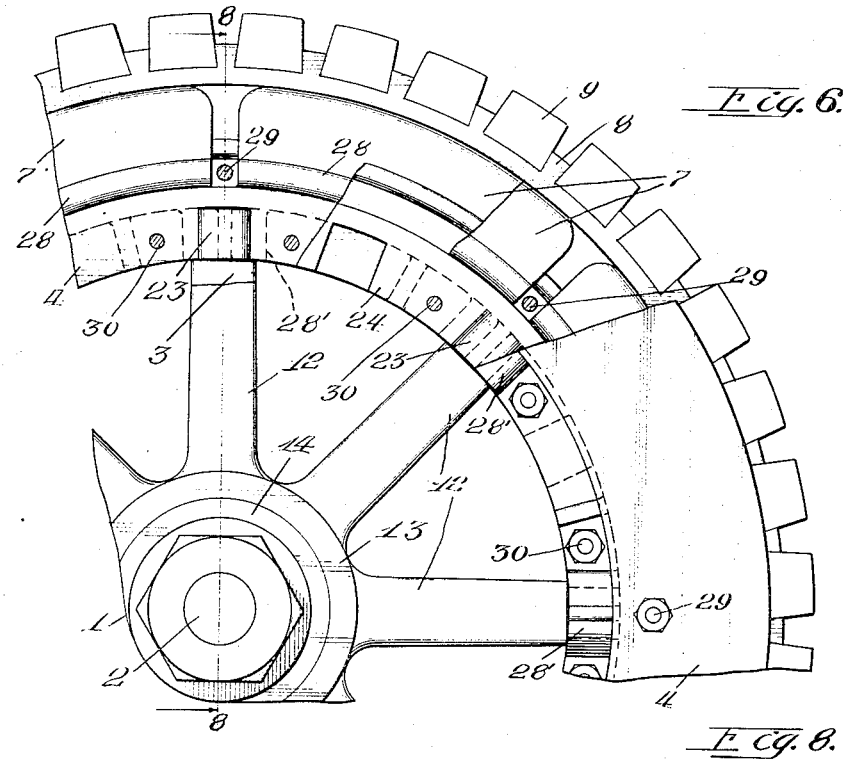
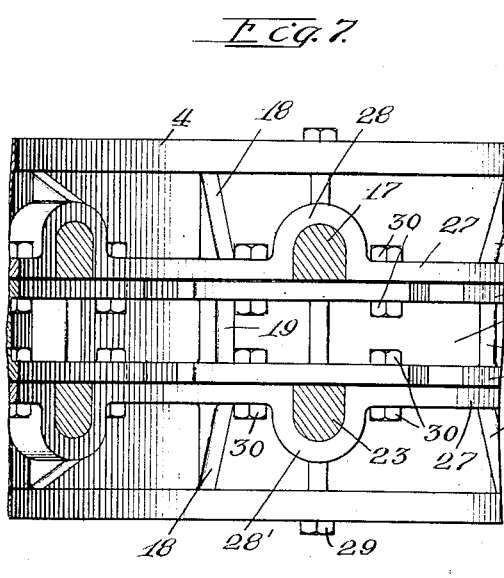
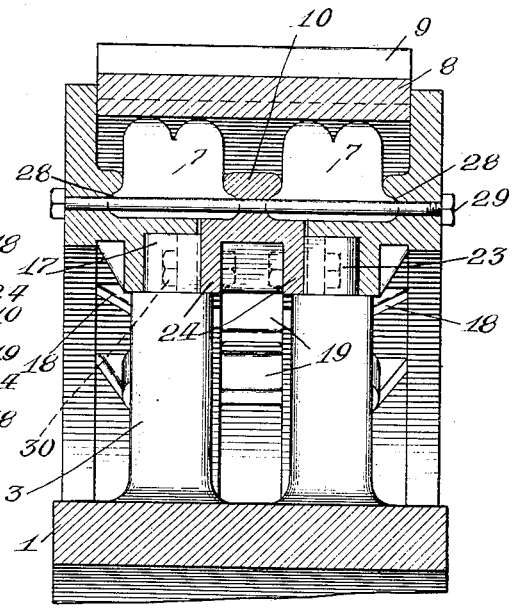
Witnesses:
H. L. Farrington
M. M. Boyle
Inventor:
Franklin A. Frömmann
by Fox & Scheible
Attorneys

UNITED STATES PATENT OFFICE.

FRANKLIN A. FROMMANN, OF CHICAGO, ILLINOIS, ASSIGNOR TO OLIVE FROMMANN, OF CHICAGO, ILLINOIS.

VEHICLE-WHEEL.

1,198,433.  Specification of Letters Patent.  Patented Sept. 19, 1916.

Application filed January 6, 1913. Serial No. 740,460.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels and particularly to the class of wheels used on heavy self-propelling vehicles such as automobile trucks.

One of its prime objects is to provide a wheel construction comprising separable spoke and rim members which, when assembled in their normal position, will simultaneously secure a plurality of cushioning members in proper operative position for providing the needed resiliency interiorly of a floatingly carried tire or tread-rim.

Another object is to provide a wheel construction permitting of a similar use of a plurality of series of spokes and of circumferentially alined cushioning members in connection with a single tire or tread-rim.

A further object is to provide stiffening members which will constitute a rigid and alining system of bracing for the various rim members when assembled so that these will offer substantially the same rigidity as if the rim were made of a single piece.

Other objects will appear from the following description and from the drawings in which:

Figure —1— is a fragmentary elevation of a wheel embodying my invention, portions of the same being cut away to disclose parts of the interior. Fig. —2— is an interior-view of a portion of the wheel part shown in Fig. —1—, looking upward from the line 2—2. Fig. —3— is a section through Fig. —1— along the line 3—3. Fig. —4— is a similar section through a part of a wheel having two radial series of spokes. Fig. —5— is a fragmentary interior view of the rim of a wheel embodying the construction of Fig. —4—. Fig. —6— is a fragmentary elevation of a wheel embodying the same construction as Fig. —4—. Fig. —7— is a partial interior view of a rim showing an alternative arrangement of the rim parts. Fig. —8— is a fragmentary sectional view of a wheel having the same construction as Fig. —7—.

In the drawings, the hub member 1 as mounted upon a shaft 2 has spokes 3 cast integral with the said hub. Each of these spokes 3 has its end 25 reduced in size to match socket formations 26 upon a rim member 4, which rim member is composed of two symmetrical halves adapted to be applied laterally to the hub member with the socket portions 26 in engagement with the reduced end portions 25 of the spokes. When thus assembled, the rim portions 4 are secured to the spokes by bolts 6 extending transversely through the rim members and by shorter bolts 5 extending through the web portions 27 of the rim members, these web portions being preferably close to each other intermediate of the socket portions 26. The rim members 4 have circumferentially outwardly extending flange portions adapted to act as lateral guides for a tire member 8 having tread blocks 9 mounted thereon, these tread blocks being preferably of wood. Interposed between the inner surface of the tire member 8 and the portions of the rim circumferentially outward of the ends of the spokes are a series of annularly disposed cushioning members 7, these being preferably of vulcanized rubber. Each of these cushioning members preferably has laterally extending base portions 28 conforming to similarly shaped grooved formations upon the inner edges of the rim members 4. Such arrangements of interiorly disposed cushioning members and of tread rim formations have been described and claimed in my co-pending applications Ser. Nos. 735721, 734876 and 740459, hence they need not be described in detail here. Intermediate of the socket formations 26, I preferably provide transverse braces or stiffening members 18 connecting the inwardly depending annular webs 27 with the circumferential portions of the rim members, these stiffening members 18 being adapted to aline with each other when the rim parts are assembled as in Fig. —2—.

Where the wheel construction of my invention is to be used on vehicles of unusual weight, for which wide treads are desirable, a plurality of radial groups of spokes may be used upon the wheel, these being arranged with the spokes of each series disposed in lateral alinement, as shown in Figs. —4— and —5—. In this case, I preferably form the hub member 1 with a circumferentially reduced portion 14 at one end of the same, one series of spokes 3 being cast upon the full-sized end of the said hub. The other series of spokes 12 is cast upon a hub portion 13 adapted to slip over the reduced end 14 of the main hub member so as to combine with the same in forming the completed hub. I then apply rim members 4 from opposite sides to the assembled spoke formations and, intermediately of the two series of spokes, I interpose an auxiliary rim member 10 having at its opposite edges socket formations 31 corresponding to the sockets 26 on the lateral rim members 4. The intermediate member 10 preferably has inwardly extending transverse stiffening ribs 19 adapted to aline with the stiffening members 18 upon the lateral rim members positioned at opposite sides of the said intermediate member.

Instead of forming socket portions 31 upon the intermediate rim 10 for coacting with the sockets 26 upon the rim members 4 in engaging the ends of the spokes 3 and 12, the intermediate rim member may be made without socketed portions, but with substantially parallel inwardly directed flanges 24, as shown in Fig. —7—. In this case the ends of each radial series of spokes would have flat lateral surfaces directed inwardly of the wheel toward the corresponding spokes of the other series, these flat portions being adapted to closely approach the said inward flanges 24. Then each of the laterally disposed rim members would have substantially U-shaped socket portions 28 adapted to engage the ends 17 and 23 of the two series of spokes.

With either arrangement of the intermediate rim portions, which may be made in a plurality of circumferentially divided sections if desired, these intermediate rim portions have oppositely directed grooved formations adapted to coact with the inwardly directed grooved formations on the rim portions 4 in clamping the bases 28 of the annularly disposed cushioning members 7 when the assembled rim portions are drawn together by the bolts 29 and 30. It will be evident that by thus forming the alined rim portions with coacting parts designed to clamp the spoke ends and the cushioning members respectively, the securing to both the spokes and the cushioning members will be effected by the bolts 29 and 30 which secure the rim members to each other, without the need of auxiliary fastenings of any kind. Likewise in the wheel construction embodying a single radial series of spokes, as shown in Figs. —1—, —2— and —3— the bolts 5 and 6 simultaneously secure the rim members to both the spokes and the cushioning members, so that no auxiliary fastenings for the latter are required. Consequently, the wheel of my invention is exceedingly simple, easy to assemble and yet strong. Besides, it provides ready access to the cushioning members for repairing or replacing the same by simply removing the bolts which secure the rim members to each other.

It will be evident that when the rim parts of my wheel are thus secured together in circumferential alinement, each laterally adjoined pair of rim parts will grip and support an annular series of cushioning members and hold them in position for outwardly engaging the floatingly carried tire-member. When thus supported, the cushioning members may overlap adjoining rim parts, while the transverse stiffeners or braces will coact in making these adjoined rim parts a rigid structure capable of firmly supporting the cushioning members against which the tire member bears centripetally.

While I have shown and described the wheel of my invention with a floating tire construction carrying wood treads, I do not wish to be limited to this particular form of outer rim or tire. Other forms of rims may be substituted, as for instance, the cushioning tread-rim shown and described in my copending application of even date herewith, Ser. No. 740459. Neither do I wish to be limited to the use of a plurality of circumferentially alined and non-rotatably secured cushioning members, as these might be joined continuously to one another if desired, the effect being substantially the same as long as these cushions provide the needed resiliency while permitting the tire member to move radially of the hub member. Again I do not wish to be limited to the exact shape or form of the laterally adjoined annular rim parts, nor to the particular shape of the opposed formations which engage the spokes and the cushioning means, it being evident that the same general plan of having cushions overlapping the juncture of laterally adjoined rim parts might be used with a variety of designs of the latter. Nor do I wish to be limited to the use of bolts for retaining or locking the rim members in their simultaneous spoke-engaging and cushion engaging relation with the rim members circumferentially in alinement. So also, I do not wish to be limited to the particular socket formations as shown on the rim members, as the opposed and coacting portions of the spokes and the rim may be considerably varied in shape while still permitting the rim members to be clampingly secured to the spokes.

I claim as my invention:

1. A vehicle wheel including a hub member carrying two sets of spokes disposed laterally of each other upon said hub, a plurality of rim members each having half sockets to receive the spoke ends and adapted to be alined with each other in spoke-engaging position.

2. A vehicle wheel including a hub member carrying two sets of spokes disposed laterally of each other upon said hub, a plurality of rim members each having half sockets to receive the spoke ends and adapted to be alined with each other in spoke-engaging position, and reinforcing integral stiffeners strengthening said sockets and the rim members between the sockets.

3. A vehicle wheel including a hub member carrying two sets of spokes disposed laterally of each other upon the said hub; a pair of rim members, each adapted to engage the ends of one set of spokes; and an intermediary rim member adapted to aline with the said pair of rim members when the latter are in their said spoke-engaging position.

4. A vehicle wheel including a hub member carrying two sets of spokes disposed laterally of each other upon the said hub; a pair of rim members, each adapted to engage the ends of one set of spokes; and an intermediary rim member adapted to aline with the said pair of rim members when the latter are in their said spoke-engaging position; there being stiffening formations upon each of the said rim members adapted to aline with one another when the members are assembled in their said alined position.

5. A vehicle wheel including a hub member carrying two sets of spokes disposed laterally of each other upon the said hub; a pair of rim members, each adapted to engage the ends of one set of spokes; and an intermediary rim member adapted to aline with the said pair of rim members when the latter are in their said spoke-engaging position; there being stiffening formations upon each of the said rim members adapted to aline with one another and with the spokes when the members are assembled in their said alined position.

In testimony whereof I have signed my name in presence of two subscribing witnesses.

FRANKLIN A. FROMMANN.

Witnesses:
ALBERT SCHEIBLE,
MAE M. BOYLE.